Patented May 19, 1931

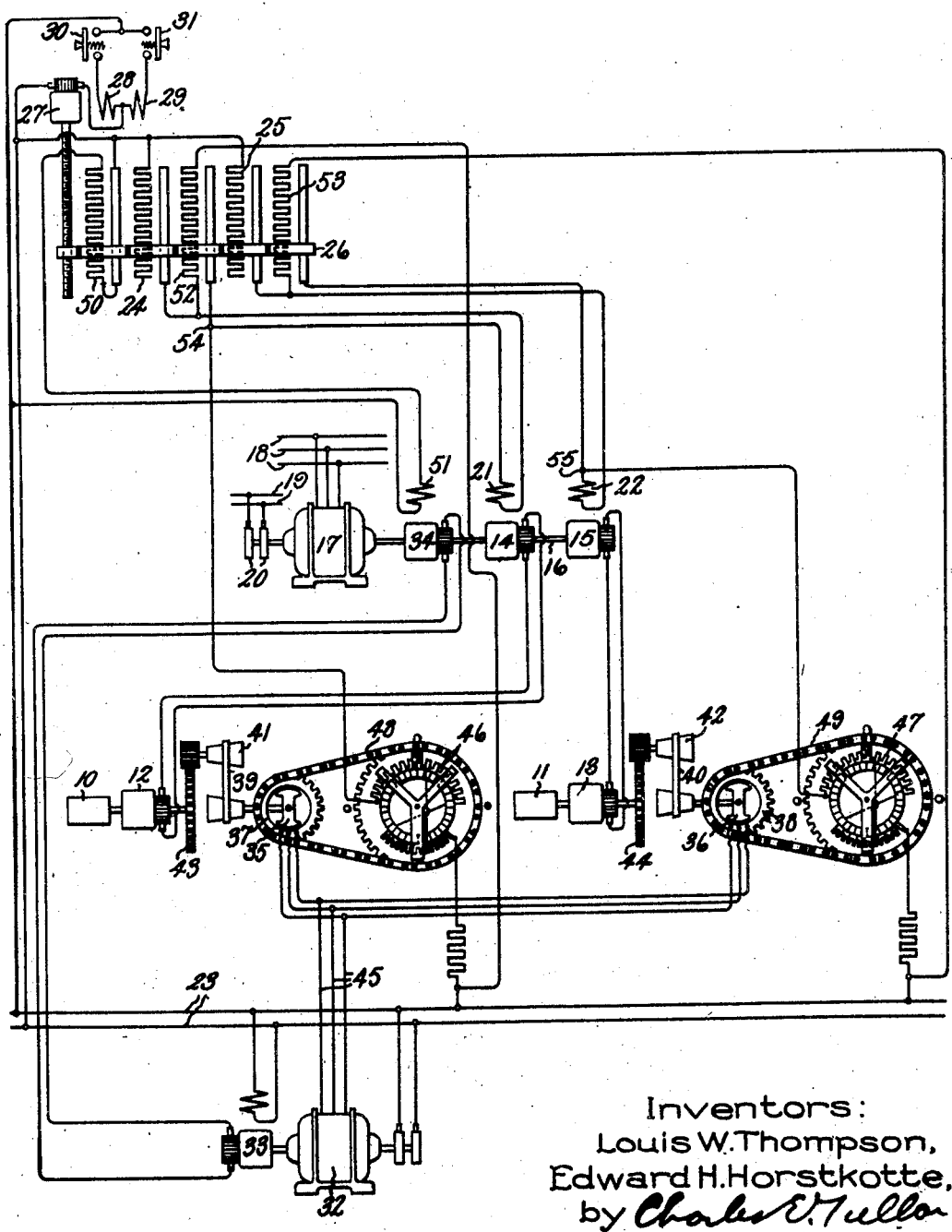

1,805,502

UNITED STATES PATENT OFFICE

LOUIS W. THOMPSON AND EDWARD H. HORSTKOTTE, OF SCHENECTADY, NEW YORK, ASSIGNORS TO GENERAL ELECTRIC COMPANY, A CORPORATION OF NEW YORK

CONTROL SYSTEM FOR DYNAMO-ELECTRIC MACHINES

Application filed April 16, 1929. Serial No. 355,554.

This invention relates to control systems for dynamo-electric machines and more particularly to control systems for dynamo-electric machines wherein the magnitude of a characteristic of the machine may be adjusted over a wide range of basic values, and thereafter maintained at a basic value by suitable regulating means and has for an object the provision of a simple and reliable means for varying the effect of the regulating means in accordance with the magnitude of the regulated characteristic.

In illustrating our invention, we have shown it as embodied in a segregated motor drive in which a plurality of sectional driving motors are respectively supplied from a plurality of individual generators, the generated voltages of which are simultaneously adjustable over a wide range of values for adjusting the speed of the drive over a corresponding range of values, and in which the speed of the drive is regulated constant at any speed to which it may be adjusted, by regulators that function to vary the generated voltages of the generators and consequently the speed of the motors supplied therefrom, in accordance with the fluctuations in the basic speeds of the motors.

In carrying our invention into effect in one form thereof, we provide potentiometer resistances in connection with the regulators for modifying the effect of the regulators in accordance with the magnitude of the value to which the voltages of the generators may have been adjusted.

For a better and more complete understanding of our invention, reference should now be made to the following specification and to the accompanying drawing, the single figure of which is a diagrammatic representation of an embodiment of our invention.

Referring now to the drawing, a plurality of rolls 10 and 11, such for example as the rolls of a paper making machine, are mounted upon the shafts or coupled therewith by suitable coupling devices, of a plurality of direct current shunt excited motors 12 and 13 respectively. With a view to simplifying the drawing, but two sections of the drive have been shown. It will be appreciated by those skilled in the art that as many sections as may be required for the particular machine to be driven may be employed. The direct current field windings for the motors 12 and 13 have been omitted for the purpose of simplifying the drawing since persons skilled in the art will understand that such windings are necessary and may be separately excited from any suitable direct current source of supply. The armatures of the motors 12 and 13 are respectively connected to and supplied from the armatures of direct current generators 14 and 15. As shown in the drawing, generators 14 and 15 are mounted upon a common shaft 16 which is driven by a large main synchronous motor 17. The synchronous motor 17 is supplied with electrical energy from a suitable source of supply such as that indicated by the three phase supply lines 18. Direct current for exciting the direct current field winding of the synchronous motor may be obtained from a suitable source of direct current such as that represented in the drawing by the supply lines 19 and may be supplied to the field winding through the slip rings 20.

The generators 14 and 15 are respectively provided with field windings 21 and 22 which are connected to and supplied with direct current from the direct current supply lines 23. Since the speed of a direct current motor is a function of the voltage supplied to its armature, a convenient and efficient method of varying the speed of the motor is to vary the current flowing in the field winding of the generator which supplies the motor.

In the drawing, provision is made for adjusting the speed of the drive over a wide range of values by means of resistors 24 and 25 connected in series with the field windings 21 and 22 respectively, and a variable contact arm 26 for varying the resistances and thereby adjusting the values of the currents flowing in the field windings. A suitable pilot motor 27 is provided for moving the arm 26 to vary these resistances. As shown, the pilot motor is supplied from the direct current supply lines 23 to which it may be connected through either of the oppositely wound series field windings by depressing either of the push buttons 30 or 31 respectively, depending upon the direction of rotation desired.

In order to maintain the various driven elements of the paper machine in fixed speed relationship, a small regulating dynamo-electric machine is provided at each section of the machine for each of the driven elements for holding the speed of each sectional motor constant at any speed to which it may have been adjusted. As shown in the drawing, these regulating dynamo-electric machines are of the synchronous dynamometer type: that is to say, they tend to maintain a relative speed of rotation between the rotor and stator members bearing a fixed relationship to the frequency of an alternating current supplied to the stator members by the control alternator 32 of a master set, shown in the drawing as a Ward-Leonard set comprising the alternator 32 mounted upon the same shaft and driven by the direct current control motor 33, the armature of which is supplied with direct current by a master generator 34 which is mounted on shaft 16 and driven by large main synchronous motor 17. The regulating dynamo-electric machines provided at the various sections of the drive comprise rotor members 35 and 36 and stator members 37 and 38 respectively. The rotor members 35 and 36 are represented as magnetic structures of fixed polarity and as being driven by the corresponding sectional drive motors 12 and 13 respectively by means of belts 39 and 40, cone pulleys 41 and 42, and gearing 43, 44, respectively, whereby the speeds of these rotors 35 and 36 are made greater than the speeds of the corresponding motors. Belts 39 and 40 may have their positions on the cone pulleys varied to adjust the speed of each driven element with respect to the speeds of the other elements as desired. Each of the stators 37, 38 is provided with a distributed three phase winding (not shown) which is connected with the alternating mains 45 which are supplied with alternating current of a frequency dependent on the speed of the control alternator 32 which is driven by control motor 33 at a speed proportional to that to which it is desired to drive the machine as a unit. The stator members 37, 38 are free to rotate in either direction about the rotor member and are constructed so as to be balanced in any position to which they may be moved and are arranged to actuate or control a suitable regulating means for the corresponding driving motors 12 and 13, which regulating means is illustrated as comprising rheostats 46 and 47 arranged to regulate the excitation of the field windings of the corresponding generators 14 and 15 and consequently the magnitude of the voltages generated by the generators 14 and 15 and supplied to the sectional driving motors 12 and 13. The rheostats 46 and 47 are arranged to be operated by the stator members 37 and 38 by means of gearing and suitable connecting drive chains 48 and 49 respectively. As illustrated, the stator members 37 and 38 have no normal position to which they are biased in any way and, therefore, the stator members 37, 38 will remain in any position to which they may have been moved in response to load variations requiring adjustment of the rheostat to compensate for the same.

It has previously been pointed out that the speed of the paper machine, that is to say the speed of all of the motors, may be varied as a unit by varying the value of the resistors 24 and 25 in the field circuits of the sectional supply generators 14 and 15. When the speed of the machine is raised or lowered as a unit, it will be appreciated that the frequency of the alternating currents supplied by the alternator 32 to the stators 37, 38 of the regulating devices must be raised or lowered in proportional amount, for otherwise the regulating devices would function to maintain the original speed. Provision therefore, for increasing or decreasing the frequency of the currents delivered by the control alternator 32 to the stators of the regulating devices is made in the form of a variable resistance section 50 connected in the circuit of the field winding 51 of the master direct current generator 34 which supplies power to the control motor 33 which drives the control generator 32. As is evident in the drawing, when the contact arm 26 is driven either in an upwardly or a downwardly direction by the pilot motor 27 to vary the resistance in the fields of the generators which supply the sectional motors, the resistance 50 is simultaneously varied in proportional amount so that the voltage of the master generator 34, the speed of the control motor 33, and the frequency of the alternating currents supplied by control generator 32 to the stators of the regulating devices all vary in the same proportion as the generated voltages of the generators 14 and 15 and the speeds of the sectional drive motors 12 and 13.

Because of the fact that the speed of the drive is adjusted over a wide range of values by adjusting the value of the resistances 24 and 25 in the circuits of the field windings 21 and 22 of generators 14 and 15 respectively, the currents which flow in these windings are likewise adjusted over a wide range of values. When it is desired that the drive shall run at low speed, the generated voltages of the generators must be of low value, and correspondingly, the currents in the field windings must be of low value, whilst when it is desired that the drive shall run at high speed, the voltages supplied to the motors must be of high value and the currents flowing in the field windings must be correspondingly high.

Now those who are skilled in the art will realize that the sensitivity and consequently regulating effect of a resistor type regulator connected in series with the field winding will be greater when the current in the winding is of a high value than when it is of the low value; that is to say, that the same ohmic change of the regulating resistance when a large current is flowing in the circuit will produce a greater change in that current than would the same ohmic change in the regulator resistance when a small current is flowing. Those who are skilled in the art will also realize that this condition of different sensitivities of the regulators at the different values of the regulated characteristics is undesirable in a system such as that shown in the drawing because at high speeds of the driving motors which correspond to high values of current in the field windings of the corresponding supply generators a small departure of the driving motor from its basic speed would tend to cause the regulator to produce a large change in the field current of the supply generator, whilst at low speeds of the drive a small departure of the motor from its basic speed would necessitate a comparatively great change in the regulating resistance to produce the necessary compensation in the generator field circuit. Thus, it will be seen that the action of the regulator would be uncertain and even erratic at high speeds and too sluggish at low speeds.

To eliminate these undesirable features, we provide potentiometer resistances 52 and 53 in parallel with the regulating resistances 46, 47 and field windings 21, 22 respectively. The field winding 21 of generator 14 and regulating resistance 46 are connected together at a common point 54 and this common point is in turn connected to a section of the variable contact arm 26 which makes sliding contact with the potentiometer resistance 52, thereby dividing the potentiometer resistance 52 into a portion in parallel with the field winding 21 and a second portion in parallel with the regulating resistance 46. Similarly regulating resistance 47 and field winding 22 are connected together at a common point 55 which is connected to another section of the variable contact arm 26 to provide a variable bridging connection dividing the potentiometer resistance 53 into two portions, one in parallel with the field winding 22 and the other in parallel with the regulating resistance 47.

With the above understanding of the elements comprising our invention and their association with each other, the operation will be readily understood from the detailed description which follows:

Assuming that the drive is running at low speed, which is shown in the drawing by the fact that substantially the full value of the resistors 24 and 25 are inserted in the circuits with the field windings 21 and 22 thereby producing a low generated voltage and consequently low speed of the driving motors, and assuming that it is desired to raise the speed of the drive as a whole, the push button 30 may be depressed to connect the pilot motor 27 across the supply lines 23 in series with the winding 28. Field winding 28 is wound in a direction to produce rotation of the motor 27 to move the variable contact arm 26 upwardly over the various resistance devices shown in the drawing. As the contact arm moves upwardly, the resistors 24 and 25 in the field circuits of the generators 14 and 15 are decreased thus increasing the current flowing in the field windings and increasing the voltages generated by the generators and likewise the speeds of the motors 12 and 13 supplied therefrom. Upward movement of the arm 26 simultaneously decreases the amount of the resistor 50 in the field circuit of the master generator 34 which supplies the control motor 33. As a result, control motor 33 speeds up in proportional amount and increases the frequency of the alternating currents supplied by control generator 32 to the stators 37, 38 of the regulating devices. The increase in frequency of the alternating currents supplied to the stators of the regulators is in such amount that the increase in speed of the rotor members 35 and 36 of the regulating devices resulting from the increased speed of the driving motors 12 and 13 respectively, will correspond with the increase in the speed of the rotating fields of the stator members and, therefore, there will be no tendency for the stator members to move unless either of the driving motors should deviate from the desired speed.

The upward movement of variable contact arm 26 will also move the variable bridging connections from the common points 54, 55 to the potentiometer resistances 52 and 53, respectively, thereby varying the portions of these resistances in parallel with the field windings 21 and 22 and the portions in parallel with the regulating resistances 46 and 47, respectively. Potentiometer resistances 52 and 53 are so arranged with respect to the variable contact arm 26 that upward movement thereof to increase the speeds of the driving motors decreases the portions of the resistances 52 and 53 in parallel with the regulating resistances 46 and 47 and increases the portions of the potentiometer resistances 52 and 53 in parallel with the field windings 21 and 22. Conversely, when the variable contact arm is moved downwardly to decrease the speeds of the motors, the portions of the potentiometer resistances in parallel with the regulating resistances 46 and 47 are increased whilst the portions in parallel with the field windings 21 and 22 are decreased.

Thus, it will be seen that at high speeds of the drive there is a low resistance shunt about each of the regulating resistances and a high resistance shunt about each of the field windings of the generators. It will also be seen that at low speeds of the drive there is a high resistance shunt about each of the regulating resistances and a low resistance shunt about each of the field windings of the generators. The effect of the above varying of the shunts is the equalization, or tendency toward equalization, of the sensitivity and regulating effect of the regulators at all values of field currents in the generator field windings and consequently at all values of speed within the speed ranges of the driving motors. In other words, the result is to reduce the normal regulating effect and the sensitivity of the regulators at high speeds of the drive and to increase the regulating effect and sensitivity of the regulators at low speeds.

No particular values of the potentiometer resistances are necessary to the operation of our invention. The exact values to be chosen and the limiting positions of the bridging connections will depend upon the amount that it is desired to increase the regulating effect of the regulators at low values of the regulated characteristic, and upon the amount that it may be desired to decrease the normal regulating effect of the regulators at high values of the regulated characteristic.

While we have described our invention as embodied in concrete apparatus and as operating in a specific manner, we would have it distinctly understood that this invention is not limited to the apparatus or connections shown in the drawing, since various alterations and changes therein will readily suggest themselves to those skilled in the art without departing from the spirit of our invention.

What we claim as new and desire to secure by Letters Patent of the United States, is:

1. In combination, a series circuit comprising a generator field winding, a regulating resistance, and a current adjusting resistance, a potentiometer resistance in parallel with said winding and said regulating resistance, and manually controlled means for simultaneously varying said potentiometer resistance and said current adjusting resistance.

2. In combination with the field winding of a generator, a regulating resistance and a current adjusting resistance in series therewith, said field winding and said regulating resistance having a common connection, a potentiometer resistance in parallel with said field winding and said regulating resistance, a variable bridging connection from said common connection to said potentiometer resistance, and manually controlled means for varying said adjusting resistance, and for simultaneously varying said bridging connection.

3. In combination, a series circuit comprising a generator field winding, a regulating resistance, and a current adjusting resistance, said field winding and said regulating resistance being connected together at a common point, a potentiometer resistance in parallel with said field winding and said regulating resistance, a variable bridging connection from said common point to said potentiometer for varying the portion of said potentiometer in parallel with said regulating resistance, and means for varying said adjusting resistance, said last named means and said bridging connection being arranged to vary said adjusting resistance and said portion proportionately.

4. In combination, a series circuit comprising a generator field winding, a regulating resistance, and a current adjusting resistance, said field and said regulating resistance being connected together at a common point, a potentiometer resistance in parallel with said field winding and said regulating resistance, a variable bridging connection from said common point to said potentiometer dividing the latter with a portion in parallel with the field winding and a second portion in parallel with the regulating resistance, means for varying said adjusting resistance and said bridging connection simultaneously, said bridging connection being arranged to vary said portion in parallel with the regulating resistance proportionately to the variation of said adjusting resistance and to vary said second portion in inverse proportion thereto.

5. In combination, a motor, a generator for supplying the motor, means comprising a variable resistor in the field circuit of said generator for adjusting the basic speed of said motor, speed regulating means for said motor including a resistance device in the field circuit of said generator and means responsive to fluctuations in the speed of said motor for varying said resistance device, a potentiometer resistance in parallel with said regulating resistance, and means for varying said potentiometer resistance in unison with said variable resistor.

6. In a system of motor control comprising a plurality of driving motors, a control motor, means responsive to variations in the speed relationship between said control motor and said driving motors for regulating the speeds of the driving motors, manually controlled means for adjusting the basic speeds of all of said driving motors simultaneously, and means operable in response to operation of said manually controlled means for equalizing the regulating effect of said speed controlling means for all basic speeds of said driving motors.

7. In a system of motor control for a segregated drive, a plurality of sections, each of said sections comprising elements including a motor and a supply generator therefor, speed regulating means for said motor including a resistance device connected to the field winding of the generator at a common point and in series relationship therewith, a potentiometer resistance in parallel with said field winding and said regulating resistance, a variable connection from said common point to said potentiometer resistance thereby dividing said potentiometer resistance into a portion in parallel with said regulating resistance and a portion in parallel with said field winding, a current adjusting resistor connected in series with said field winding, means for adjusting the speed of the drive as a unit comprising a manually controlled motor for simultaneously varying the respective adjusting resistances and the said variable connections, said potentiometer resistances being arranged to have the portions in parallel with the regulating resistances decreased and said second portions increased when the adjusting resistances are decreased.

8. In a system of motor control for a segregated drive, a plurality of sections, each of said sections comprising elements including a motor and a supply generator therefor, speed regulating means for said motor including a resistance device connected to the field winding of the generator at a common point and in series relationship therewith, a potentiometer resistance in parallel with said field winding and said regulating resistance, a variable connection from said common point to said potentiometer resistance for dividing said potentiometer resistance into a portion in parallel with said regulating resistance and a portion in parallel with said field winding, a current adjusting resistor connected in series with said field winding, and means for increasing the speed of the drive as a unit comprising means for simultaneously decreasing said adjusting resistance and varying said variable connection to decrease said portion in parallel with the regulating resistance and increase said portion in parallel with said field winding.

9. In a system of motor control for a segregated drive, a plurality of sections, each of said sections comprising elements including a motor and a supply generator therefor, speed regulating means for said motor including a resistance device connected to the field winding of the generator at a common point and in series relationship therewith, a potentiometer resistance in parallel with said field winding and said regulating resistance, a variable connection from said common point to said potentiometer resistance thereby dividing said potentiometer resistance into a portion in parallel with said regulating resistance and a portion in parallel with said field winding, a current adjusting resistor connected in series with said field winding, and means for adjusting the speed of the drive as a unit comprising means for simultaneously varying said adjusting resistances and said variable connections, said potentiometer resistances being arranged to have the portions in parallel with said regulating resistances varied in direct proportion with said adjusting resistances whereby a low resistance shunts the regulating resistance at high speeds, and a high resistance shunts the regulating resistance at low speeds.

In witness whereof, we have hereunto set our hands this 15th day of April, 1929.

LOUIS W. THOMPSON.
EDWARD H. HORSTKOTTE.